United States Patent [19]

Narita

[11] 4,313,985
[45] Feb. 2, 1982

[54] PLASTIC AUTO PART AND ITS MANUFACTURING PROCESS

[75] Inventor: Kozi Narita, Nagoya, Japan

[73] Assignee: Inoue Gomu Kogyo Kabushika Kaisha, Aichi, Japan

[21] Appl. No.: 207,202

[22] Filed: Nov. 14, 1980

Related U.S. Application Data

[63] Continuation-in-part of Ser. No. 967,630, Dec. 8, 1978, abandoned.

[30] Foreign Application Priority Data

Dec. 4, 1978 [JP] Japan .............................. 53-166947

[51] Int. Cl.³ ............................................ B60R 13/00
[52] U.S. Cl. ..................................... 428/31; 428/131; 428/133; 428/336
[58] Field of Search ................. 428/31, 131, 133, 336; 156/73.1

[56] References Cited

U.S. PATENT DOCUMENTS 3,419,458 12/1968 Brooks et al. .
3,436,297 4/1969 Brooks et al. .
3,711,360 1/1973 Kent .
3,811,989 5/1974 Hearn ..................................... 428/31

Primary Examiner—Marion McCamish
Attorney, Agent, or Firm—Armstrong, Nikaido, Marmelstein & Kubovcik

[57] ABSTRACT

Plastic auto part characterized in that a decorative trim, which represents a plastic substrate laminated with metal foil on one side, is ultrasonic-welded to an auto part, whereby the other side, not laminated with metal foil, of said plastic substrate faces the surface of said auto part without injuring the decorative trim, and its manufacturing process.

8 Claims, 8 Drawing Figures

PLASTIC AUTO PART AND ITS MANUFACTURING PROCESS

This application is a continuation-in-part of application Ser. No. 967,630, filed Dec. 8, 1978 now abandoned.

BACKGROUND OF THE INVENTION

1. Field of the Invention

The present invention relates to a plastic auto part attached with a decorative trim or trim strip (hereafter referred to simply as "decorative trim"), and more particularly to a plastic auto part attached by ultrasonic welding with a decorative trim, which represents a plastic substrate laminated with metal foil on one side, and the manufacturing process of such a plastic auto part.

2. Description of the Prior Art

Recently plastic auto parts have come into wide use by virtue of their light weight, and they are variously plated to give them a metallic appearance and to enhance their resistance to weather and heat. Some of them are big, such as front grille or lamp housing, and others are complicated in configuration. Thus, it has been difficult to plate them uniformly at appropriate positions and, in consequence, many inferior goods have been produced.

Meanwhile, these auto parts are often attached with various plastic decorative trims. These trims are usually made of clear plastics of PVC or cellulose acetate resin in which an aluminum foil or a film with vapor-deposited aluminum is enclosed. Also, they are usually fitted to the auto parts by mechanical means, such as a leg, provided in the trim or a clip otherwise provided. Such mechancial means of fitting is liable to drop out and some other means of fitting the trim itself by, for example, ultrasonic welding, has been desired. Ultrasonic welding is not, applicable to said plastic trims which have a soft decorative surface.

SUMMARY OF THE INVENTION

The object of the present invention is to provide a plastic auto part and its manufacturing process in which a plastic auto part is attached by ultrasonic welding with a decorative trim which can stand the working of such a tool as an ultrasonic horn without being injured thereby.

Other objects of the present invention will become apparent from the following detailed description referring to the attached drawings.

DETAILED DESCRIPTION OF THE INVENTION

Figure 1:
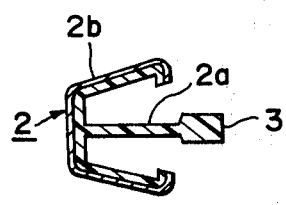
FIG. 1 is a sectional view of a decorative trim or trim strip with plastic substrate which is to be attached to the auto front grille.

In FIGS. 1-4, the front grille 1 is an appropriate molding of such relatively rigid resin which has a stiffness or modulus of elasticity greater than 7,000 kg/cm² (100,000 psi) at 23° C., such as acrylonitrile-butadiene-styrene resin (ABS), polyacrylonitrile-styrene resin (AS), polypropylene (PP), polyphenylene oxide (PPO) or rigid PVC having up to 10% of a plasticizer therein or such resin reforced with glass fibers.

The decorative trim 2 consists of a rigid resin substrate 2a which has a stiffness or apparent modulus of elasticity greater than 7,000 kg/cm² (100,000 psi) at 23° C., and which is the same material on the front grille as laminated on the surface with a metal foil 2b of, for example, stainless steel.

The substrate 2a of said decorative trim 2 is made of the same resin which constitutes an object to be attached (in this case, the front grille 1) or a resin having compatibility to the front grille resin. Namely, if the front grille is made of ABS, said substrate 2a is also made of ABS or AS.

The stainless metal foil 2b constituting the decorative surface of the trim is desirably 50μ thick at least.

Figure 2:
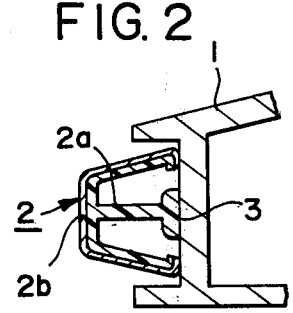
FIG. 2 is a sectional view of the decorative trim in FIG. 1 as attached to the auto front grille by ultrasonic welding.
Figure 3:
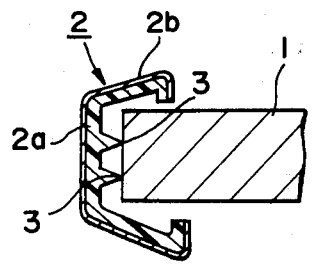
FIG. 3 is a sectional view of a decorative trim with a different configuration from the one in FIG. 1, just before ultrasonic-welding to an auto part.
Figure 4:
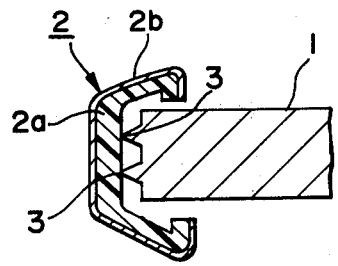
FIG. 4 is a sectional view of an embodiment of the present invention in which the weld-forming projection is provided on the auto-part, just before ultra-sonic welding.
Figure 5:
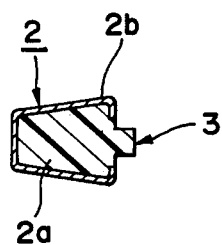
FIG. 5 is a sectional view of a decorative trim with a plastic substrate to be attached to the auto lamp housing.
Figure 6:
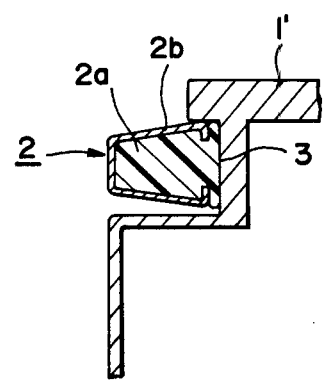
FIG. 6 is a sectional view of the decorative trim in FIG. 5, as ultrasonically-welded to the auto lamp housing.

In FIGS. 1 and 2, the decorative trim has an approximate configuration of T or E, of which the tip of the central leg serves as the welded part 3, but a number of protections to be welded may be provided as in FIG. 3 or the welded part 3 may be provided on the auto part 1, as illustrated in FIG. 4. Or, as illustrated by lamp housing 1' in FIGS. 5 and 6, the substrate 2a may be partially projected to form the welded part 3. The configuration can be arbitrary. Of course, it is possible to provide a positioning groove on the front grille 1 or the lamp housing 1' to receive the leg of the decorative trim 2.

Figure 7:
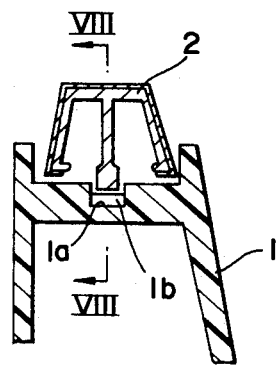
FIG. 7 is a sectional view of the decorative trim in FIG. 1, just before ultra-sonic welding to a groove provided on the auto front grille.
Figure 8:
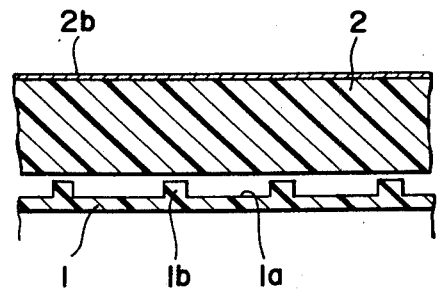
FIG. 8 is a sectional view taken along the line VIII—VIII of FIG. 7.

In this case, as shown in FIGS. 7 and 8, it is desirable to provide projections 1b of about 10 mm width in the groove 1a at the predetermined intervals of 100–200 mm so as to partially weld the projections 1b and the tip of the leg of decorative trim 2. In these Figures, the length of the tip of the leg projecting from the underside of the trim 2 is outwardly extended over the line connecting the edges of the both-side legs of the trim 2 to the extent of the length approximately the same as the depth of the groove 1a. When welding of the trim to the projection 1b in the groove is completed, the other tips of the legs are in contact with the bottom of the groove of the front grille 1 and the like.

Thus, according to the present invention, a decorative trim 2 in which plastic objects 1,1' to be attached are laminated with a stainless foil 2b which is not injured by ultrasonic horn-welding, is ultrasonically-welded to an auto part of plastic, with the substrate 2a facing the surface of the auto part.

In this way, the decorative trim 2 with a plastic substrate 2a can be ultrasonically welded to the surface of an auto part 1 or 1' without injuring the decorative 2b of the trim 2.

Moreover, ultrasonically-welded trim 2 will never drop out.

What is claimed:

1. An automobile trim strip for attachment to a portion of an automobile formed from a rigid resin having a modulus of elasticity greater than 7,000 kg/cm² at 23° C., selected from the group consisting essentially of acrylonitrile-butadiene-styrene resin, acrylonitrile-styrene resin, polypropylene, polyphenylene oxide or polyvinyl chloride having up to 10% by weight of a plasticizer therein or a glass fiber reinforced resin thereof, said trim strip comprising a substrate having a welding portion means for ultrasonic weld attachment to said portion of an automobile, said welding portion means extending from said substrate, and a U-shaped metal foil layer covering a portion of said substrate wherein said welding portion means is positioned between the planes defined by the legs of the U of the U-shaped metal foil layer and said welding portion means does not contact said metal foil layer, and wherein said substrate and said welding portion means are formed from a rigid resin, having a modulus of elasticity greater than 7,000 kg/cm² at 23° C., selected from the group consisting essentially of acrylonitrile-butadiene-styrene resin, acrylonitrile-styrene resin, polypropylene, polyphenylene oxide, or PVC having up to 10% by weight of a plasticizer therein or a glass fiber reinforced resin thereof.

2. The plastic auto part of claim 1 wherein the metal foil of said decorative trim is stainless steel.

3. The plastic auto part of claim 2 wherein the metal foil of said decorative trim is over 50μ thick.

4. The plastic auto part of claim 2 wherein said automobile portion is an auto front grille.

5. The plastic auto part of claim 4 wherein the substrate of said decorative trim has an approximate configuration of T.

6. The plastic auto part of claim 4 wherein the substrate of said decorative trim has an approximate configuration of E.

7. The plastic auto part of claim 2 wherein said automobile portion is an auto lamp housing.

8. The plastic auto part of claim 7 wherein said decorative trim includes a projecting portion, said projecting portion being said automobile portion.

* * * * *